United States Patent [19]

Tsai et al.

[11] Patent Number: 5,745,465

[45] Date of Patent: Apr. 28, 1998

[54] DIGITAL VIDEO DISC PICK-UP HEAD SYSTEM

[75] Inventors: Shin-Ter Tsai, Hsinchu Hsien; Zu-Wen Chao, Shinchu City, both of Taiwan

[73] Assignee: Industrial Technology Research Institute, Taiwan

[21] Appl. No.: 786,330

[22] Filed: Jan. 23, 1997

[51] Int. Cl.$^6$ ................................................ G11B 7/00
[52] U.S. Cl. ............................................ 369/110; 369/112
[58] Field of Search ................................ 369/118, 112, 369/110, 109, 44.23, 44.24, 13, 32

[56] References Cited

U.S. PATENT DOCUMENTS

| | | | |
|---|---|---|---|
| 4,507,773 | 3/1985 | McCann et al. | 369/110 |
| 5,237,549 | 8/1993 | Shimozawa | 369/44.25 |
| 5,418,774 | 5/1995 | O'Hara et al. | 369/47 |
| 5,442,615 | 8/1995 | Ohsato et al. | 369/112 |
| 5,523,994 | 6/1996 | Ando et al. | 369/118 |

*Primary Examiner*—Nabil Hindi
*Attorney, Agent, or Firm*—Rabin, Champagne, & Lynt, P.C.

[57] ABSTRACT

A digital video disc optical pick-up head system has a laser light source, a beam splitter, a collimating len, a polarization changer, a deflecting mirror, an optical crystal assembly, an objective len and a photosensor assembly. These optical components together constitute an optical pick-up head system that generates only a single focus at any one time. When an alternative focus is required, polarized light of an alternative polarization is used for generating a detectable opto-electrical signal for the photosensor.

18 Claims, 5 Drawing Sheets

DIGITAL VIDEO DISC PICK-UP HEAD SYSTEM

BACKGROUND OF THE INVENTION

1. Field of Invention

This invention relates in general to a pick-up head system, and more particularly to digital video disc (DVD) optical pick-up head system employing an optical crystal assembly along with a polarization changer to form a system having only a single focus at any one time.

2. Description of Related Art

Digital Video Disc (DVD)/Compact Disc (CD) machines nowadays have the ability to read/write data to and from either the DVD or CD disks on demand. To achieve proper selection of disc, the pick-up head system of these machines must be able to generate two focuses. The first focus having a shorter focal length is used for playing DVD while the second focus having a longer focal length is for playing CD.

At present, a conventional single objective len DVD optical pick-up head system has a structural layout similar to that as shown in FIG. 1. Referring to FIG. 1, the principles of operation are as follows:

(1) A light beam having an energy of E0 is emitted from a laser light source 11, and after passing through a beam splitter 12, its energy is reduced to E1 (E1=0.5E0). The light beam having an energy of E1 is then moved on, and after passing through a collimating lens 13 and a deflecting plane mirror 14, finally reaches the holographic component 15.

(2) At the holographic component 15, light is deflected into two separate beams; one is a zero-order beam, or H0 beam for short; another is a first-order beam, or H1 beam for short. The energy content of the H0 beam is E2 while the energy content of H1 beam is E3. Through proper design and precise workmanship of the holographic component 15, energy E2 of the beam H0 will approach the ideal value of E2=0.5E1=0.25E0; and similarly, energy E3 of beam H1 will approach the value of E3=0.5E1=0.25E0 as well.

(3) Both beams H0 and H1 race onward toward the objective len 16. After passing through the objective len 16, beam H0 forms a focus A at the neighborhood of the DVD surface 17 while beam H1 forms a focus B at the neighborhood of the CD surface 19. The focal length of focus A is shorter, typically around 3.4 mm and the focal length of focus B is slightly longer, typically around 3.5 mm.

(4) Both beams H0 and H1 are simultaneously reflected back from the disc surfaces 17 and 19 respectively. Supposing the beam H0 after reflection from the DVD surface 17 is renamed H0J0 and its energy content is E4, and if the reflectivity from disc surface 17 is 100%, then the energy content of beam H0J0 is E4=E2=0.25E0. The beam H0J0 now moves in a downward direction, and after passing through the objective lens 16, reaches the holographic component 15. The beam H0J0 is similarly deflected and generates two beams, if the beams are respectively called K0 and K1, then the beam H0J0 after passing through the holographic component 15 can be refered to as H0J0K0 and H0J0K1 respectively. The energy content of beam H0J0K0 is E5=0.5E4=0.125E0 while the energy content of beam H0J0K1 is E6=0.5E4=0.125E0. Thereafter, both beams H0J0K0 and H0J0K1 pass on by way of the deflecting plane mirror 14, through the collimating lens 13, the beam splitter 12 and enter into a photosensor assembly 18.

Supposing the beam H1 after reflection from the CD surface 19 is renamed H1J1 and its energy content is E7, and if the reflectivity from disc surface 19 is 100%, then the energy content of beam H1J1 is E7=E3=0.25E0. The beam H1J1 now moves in a downward direction, and after passing through the objective lens 16, reaches the holographic component 15. The beam H1J1 is similarly deflected and generates two beams, if the beams are respectively called K0 and K1, then the beam H1J1 after passing through the holographic component 15 can be referred to as H1J1K0 and H1J1K1 respectively. The energy content of beam H1J1K0 is E8=0.5E4=0.125E0 while the energy content of beam H1J1K1 is E9=0.5E4=0.125E0. Thereafter, both beams H1J1K0 and H1J1K1 pass on by way of the deflecting plane mirror 14, through the collimating lens 13, the beam splitter 12 and enter into a photosensor assembly 18.

Hence, at any moment, there will be four beams H0J0K0, H0J0K1, H1J1K0 and H1J1K1 all impinging upon the photosensor assembly 18. However, only a single beam having a good beam profile can concentrate enough energy to generate a strong opto-electrical signal in the photosensor assembly 18; all the rest of the beams, due to their poorer beam profiles, lose most of their energy outside the photo-sensitive areas of the photosensor 18, and therefore will not be picked up by the photosensor assembly 18 and converted into a meaningful detected opto-electrical signal.

(5) When a DVD is placed inside the system, the focusing servo unit will automatically program the system and lock the disc surface 17 at the focusing point A. Thus, only the beam H0J0K0 can secure a good beam profile generating strong detectable opto-electrical signals. If the beam H0J0K0, after reflection at the beam splitter 12 and heading toward the photosensor 18, has an energy E10, then E10=0.5E5=0.0625E0.

(6) When a CD is placed inside the system, the focusing servo unit will automatically program the system and lock the disc surface 19 at the focusing point B. Thus, only the beam H1J1K1 can secure a good beam profile generating strong detectable opto-electrical signals. If the beam H1J1K1, after reflection at the beam splitter 12 and heading toward the photosensor 18, has an energy E11, then E11=0.5E9=0.0625E0.

In general, no matter whether a DVD or a CD is being played in the system, the percentage of energy returned for a conventional system is at most 6.25%.

The conventional optical pick-up head system described above has at least two major disadvantages, namely, as follows:

(A) Energy wasted:

In the aforementioned optical processing system, the light beam has to pass through a low efficiency holographic plate that has a number of multi-order deflections both on its onward and its return journey, and some of the energies of these deflected beam are simply dumped and therefore wasted in the process. The actual amount of energy collected by the photosensor is very small, and so rather weak signals are generated.

(B) Interfering with the servo mechanism:

As mentioned in process (3) above, focus A targeting a DVD and focus B targeting a CD coexist together. Although one focus is selected at any one time in the system, the light beam from the other focus is allowed to diffuse in all directions on nearby disc location. Diffused light creates noises which tend to interfere with the servo focusing unit, and in extreme cases, can lead to an erroneous servo action, for example, focusing on point B instead of focusing on point A when playing with DVD.

SUMMARY OF THE INVENTION

It is therefore an object of this invention to provide an optical pick-up head system without the need for the beam to pass through a low efficiency holographic plate both on its onward and its return journeys. Hence, there is no multi-level deflections and no accompanied energy wastage through discarded beams.

Another object of this invention is to provide an optical pick-up head system having a single focus at any one time, and using an optical converter (in fact, a polarization changer) to carry out the actual focus switching action.

According to the objects stated above, an optical pick-up head system used for reading and writing data on a disc is suggested. The main components of this system include a two-piece optical crystal assembly together with a polarization changer. The optical pick-up head system in this invention includes:

a polarized laser light source for generating a first light beam;

a beam splitter for receiving the first light beam and generating a second light beam having an energy lower than the first light beam, moreover, the propagating direction for the second light beam is the same as the first one;

a collimating lens for receiving the second light beam and generating a parallel light beam moving approximately horizontally;

a polarization changer for receiving the parallel light beam and converting it to a third light beam moving approximately horizontally;

a deflecting mirror for receiving the horizontal third light beam and changing its direction to an upward moving fourth light beam;

an optical crystal assembly for receiving the fourth light beam and generating an approximately upward moving fifth light beam;

an objective len for receiving the fifth light beam and making the light beam focused on the disc surface, also for receiving light reflected from the disc surface and generating an approximately vertically downward moving sixth light beam; and a photosensor assembly for receiving the approximately vertical downward moving seventh light beam after the sixth light beam has passed through the beam splitter, and generating a detectable opto-electrical signal.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENTS

Figure 1:
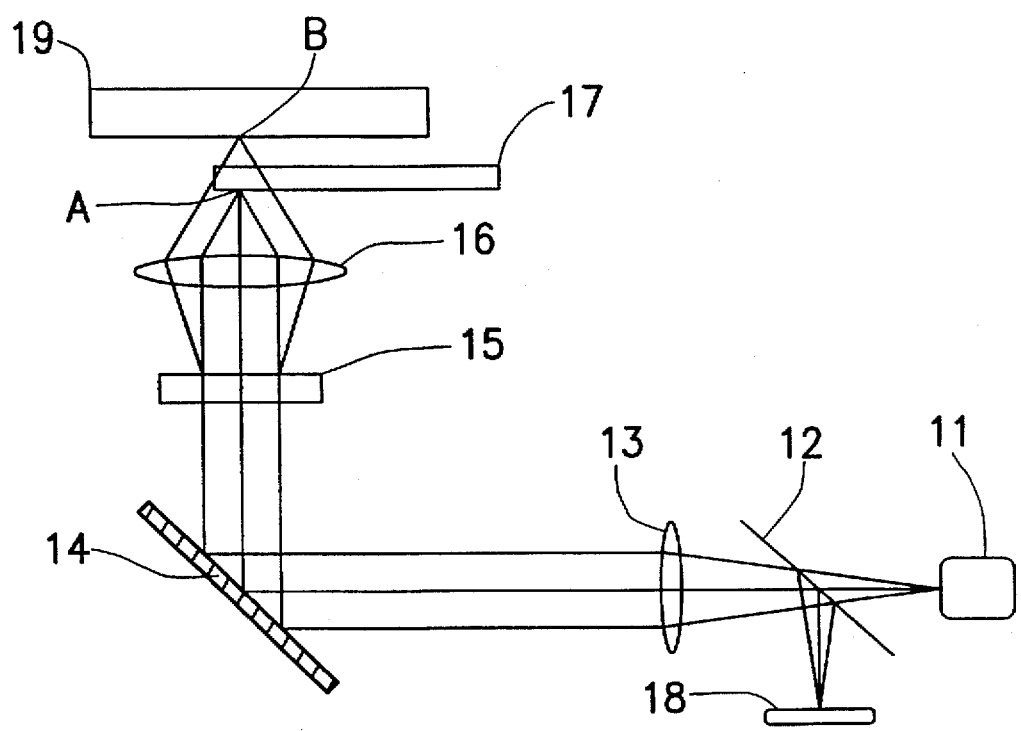
FIG. 1 shows a structural layout of a conventional single objective len DVD optical pick-up head system.
Figure 2:
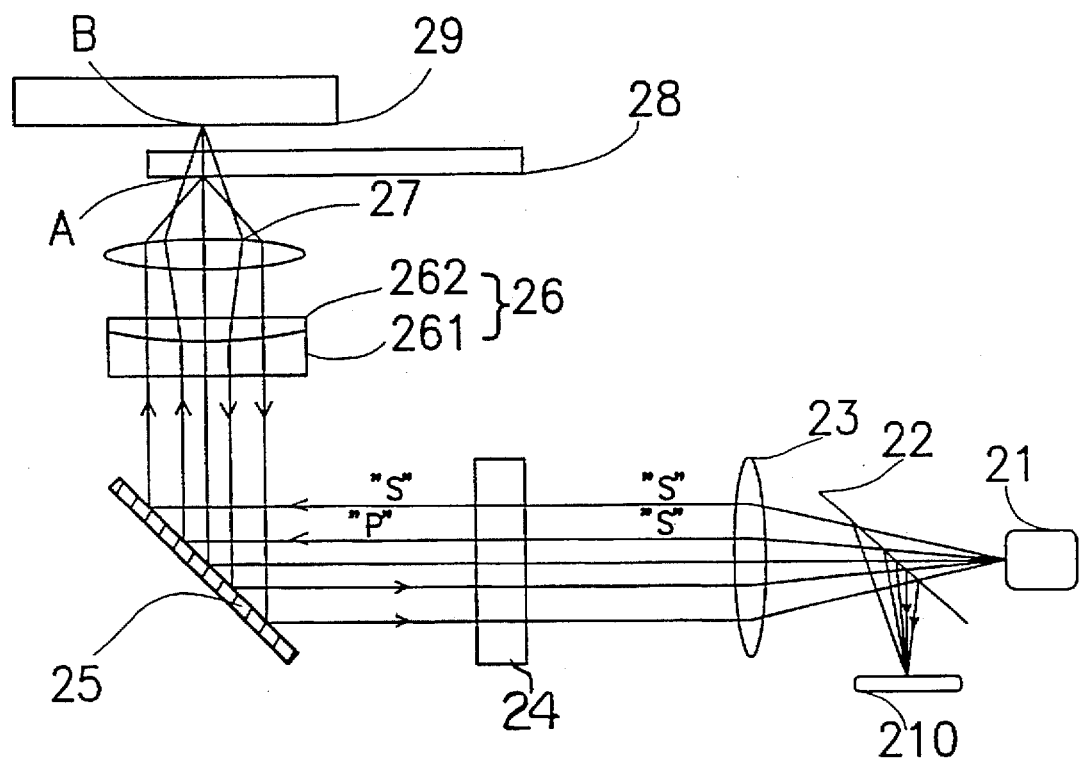
FIG. 2 shows a structural layout of a DVD optical pick-up head system according to one preferred embodiment of this invention.
Figure 3:
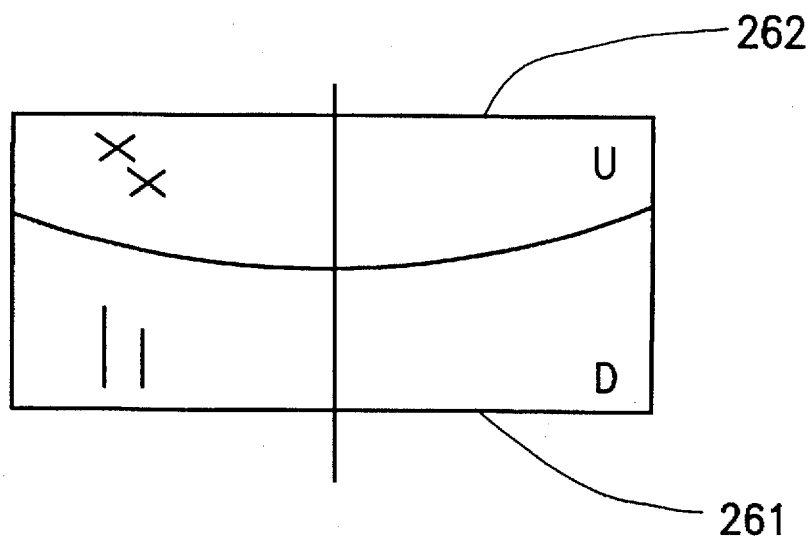
FIG. 3 shows one preferred embodiment of a two-piece optical crystal assembly as indicated in FIG. 2.
Figure 3:
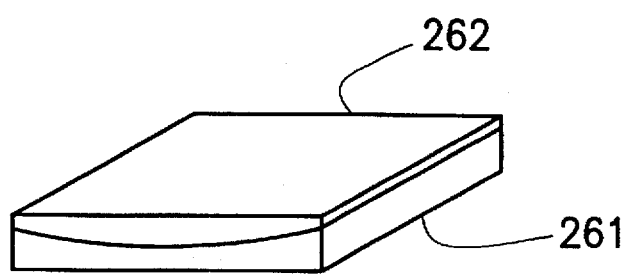

FIG. 2 shows a structural layout of a DVD optical pick-up head system according to this invention. Referring to FIG. 2, the DVD optical pick-up head system includes a laser diode 21, a beam splitter 22, a collimating lens 23, a polarization changer 24, a deflecting mirror 25, an optical crystal assembly 26, an objective lens 27, a DVD 28 (or CD 29) and a photosensor assembly 210. The optical crystal assembly 26 is assembled from two pieces of optical crystals made from the same kind of material. The operating principles of this invention are described as follows:

(1) When a DVD 28 is in use, a "S" polarized beam or a first beam is made to emit from the laser source 21 having a radiant energy of E0. The first beam passes through a beam splitter 22 and emerges as a second beam having an energy E1 (E1=0.5E0). The "S" polarized beam with energy E1 moves on and after passing through the collimating len 23, is converted into a parallel beam. The parallel beam moves on until it reaches the polarization changer 24. Since no action is required for the polarization changer yet, the "S" polarized beam with energy E1 passes on unchanged as a third beam. The third beam moves on and is deflected upward by the deflecting mirror 25 to become a fourth beam. The state of polarization for the fourth beam is still "S" polarized. The fourth beam continues upward and enters the optical crystal assembly 26. This optical crystal assembly 26 is composed of two optical crystals made from the same kind of material, for example, calcite. FIG. 3 shows a preferred embodiment of a two-piece optical crystal assembly as indicated in FIG. 2. The optical axis of one piece, the D-piece 261, is parallel to the system's optical axis while the other piece, the U-piece 262 is perpendicular to the system's optical axis. The interface between the D-piece 261 and the U-piece 262 is a curved surface, for example, a cylindrical surface or an aspherical surface. When the "S" polarized beam enters into the D-piece 261, subject to a refractive index no. of approximately 1.6, the direction of propagation remains unchanged and passes on as parallel light. When the "S" polarized beam enters into the U-piece 262, subjected to a refractive index no. of approximately 1.6 again, the direction of propagation also remains unchanged and moves on emerging as a parallel fifth beam. The fifth beam, after passing through the objective len 27, is focused forming a shorter focal length focus at focal point A on the DVD surface 28. Up to this stage, there is still no photonic energy loss at focal point A, the energy E2 remains at a value of E2=E1=0.5E0. When the light is reflected back from the DVD surface 28 at focal point A, assuming the reflectivity of disc 28 is 100%, the light becomes a sixth beam with an energy E3 having a value E3=E2=0.5E0. The reflected beam passes through the objective len 27, the optical crystal assembly 26, the deflecting mirror 25, the polarization changer 24, the collimating len 23 and finally reaches the beam splitter 22. In here, a part of the beam is reflected but some residual reflected light moves on in a downward direction and emerges as a seventh beam. The seventh beam has a focus on the photosensor assembly 210 with a beam energy of E4 whose value is E4=0.5E3=0.25E0. Thus a detectable opto-electrical signal coming from the DVD is generated.

(2) When a CD 29 is in use, an "S" polarized beam or a first beam is emitted from the laser source 21 having a radiant energy of E0. The first beam passes through beam splitter 22 and emerges as a second beam having an energy E1 (E1=0.5E0). The "S" polarized beam with energy E1 moves on and after passing through the collimating len 23, is converted into a parallel beam. The parallel beam moves on until it reaches the polarization changer 24. Now the polarization changer 24 is activated such that when the "S" polarized beam with energy E1 has passed through the polarization changer 24, the beam emerges as a "P" polarized third beam. This third beam moves on and is deflected vertically upward by the deflecting mirror 25 and the resulting fourth beam is still "P" polarized. The fourth beam continues to move upward and enters the optical crystal assembly 26. When the "P" polarized beam enters into the D-piece 261, subjected to a refractive index no. of approximately 1.6, the direction of propagation remains unchanged and passes on as parallel light. However, when the "P" polarized beam enters into the U-piece 262, subjected to a refractive index no. of approximately 1.4, there will be a deflection of light at the D-piece 261/U-piece 262 interface according to Snell's Law forming a non-parallel divergent beam, namely, a fifth beam. The fifth beam continues moving upward and after passing through the objective lens 27, is focused forming a longer focal length focus at focal point B on the CD surface 29. Up to this stage, there is still no photonic energy loss at focal point B, the energy E5 remains at a value of E5=E1=0.5E0. When the light is reflected back from the CD surface 29 at focal point B, assuming the reflectivity of disc 29 is 100%, the reflected light having no energy lost becomes a sixth beam. The reflected beam passes through the objective len 27, the optical crystal assembly 26, the deflecting mirror 25, the polarization changer 24, the collimating len 23 and finally reaches the beam splitter 22. Here, the energy content E6 of beam six remains unchanged and has a value of E6=E1= 0.5E0. At the beam splitter 22, part of the beam is reflected but some residual reflected light moves on in a downward direction and emerges as a seventh beam. The seventh beam has a focus on the photosensor assembly 210 with a beam energy of E7 whose value is E7=0.5E6=0.25E0. Thus the detectable opto-electrical signals coming from the CD is generated.

In general, no matter whether a DVD 28 or a CD 29 is in used, the detectable opto-electrical signals coming back are both 0.25E0 according to this invention. That is, the returning beam has photonic energy approximately 25% of the original beam emitted by the laser source.

Figure 4:
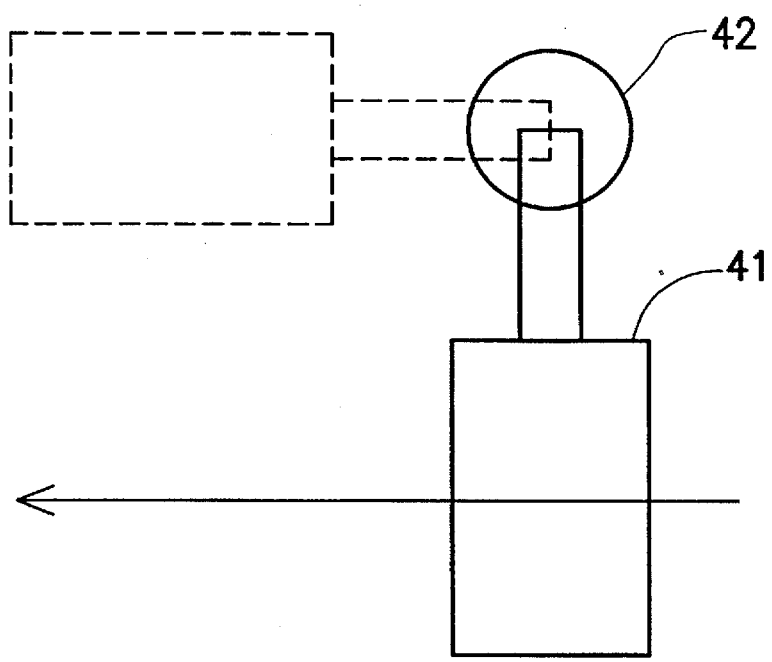
FIG. 4 shows one preferred embodiment of a polarization changer as indicated in FIG. 2.

The polarization changer 24 in FIG. 2 has at least two types of possible implementations, namely, an A-type and a B-type:

A. Mechanical Type:

Referring to FIG. 2 and FIG. 4, where FIG. 4 shows a mechanical type of polarization changer. The polarization changer 24 is composed of a half wavelength plate 41 linked to a rotatable mechanical arm assembly 42. When a DVD 28 is in use, the rotatable mechanical arm assembly swings the half wavelength plate 41 away from the path of the light beam, so that the "S" polarized light emitted from the laser source 21 moves on as "S" polarized light after passing through the polarization changer 24. However, when a CD 29 is in use, the rotatable mechanical arm assembly 42 swings the half wavelength plate 41 back into the path of the light beam so that the "S" polarized light emitted from the laser source 21 interacts with the polarization changer 24 and becomes a "P" polarized light after traversing through.

Figure 5:
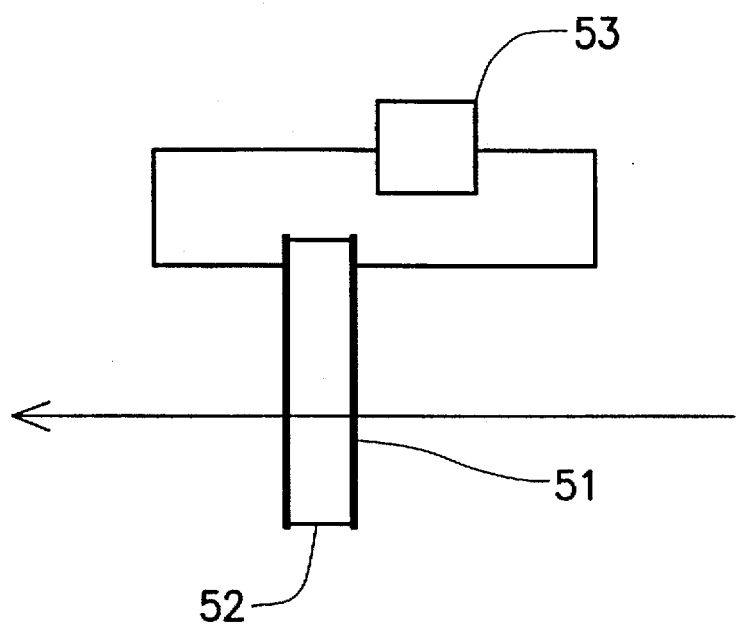
FIG. 5 shows a second preferred embodiment of a polarization changer as indicated in FIG. 2.

B. Electronic Type:

Referring to FIG. 2 and FIG. 5, where FIG. 5 shows an electronic type of polarization changer. The electronic polarization changer 24 is composed of a liquid crystal plate 52 coated with transparent electrodes 51 at both ends and a voltage supply circuit system 53. The liquid crystal plate 52 is fixed in a position along the path of the beam. When a DVD 28 is in use, no voltage is supplied to the liquid crystal plate 52 via the voltage supply circuit system 53. As a result, the "S" polarized light emitted from the laser source 21 continues on as "S" polarized light after passing through the polarization changer 24. When a CD 29 is in use, a voltage is supplied to the liquid crystal plate 52 form the voltage supply circuit system 53, so that the "S" polarized light emitted from the laser source 21 becomes a "P" polarized light after traversing the polarization changer 24.

From the above description of the preferred embodiment, the advantages of this invention includes the following:

(1) No holographic plate is used in this invention, and so there is no multi-order deflection of light leading to excessive wastage of light energy. In the meantime, the reflected beam is able to reach the photosensor assembly generating a rather strong detectable signal. For example, in the aforementioned embodiment, the reflected light is roughly 25% of the energy of the emitted light source; on the other hand, the reflected light in a conventional system is only about 6.25% of the emitted light source, therefore the technique used in this invention is four times more efficient as compared with the conventional ones.

(2) The working principles of this invention is based on activating the polarization changer to make a functional change, and thereby causing a change of state of polarization in the system. When a DVD is in use, the polarization changer is deactivated, and the light beam is maintained parallel and "S" polarized all the way from the light source to the optical crystal assembly, and forming a single focus having a shorter focal length on the DVD surface. When a CD is in use, the polarization changer is now activated, making the light beam before entering into the optical crystal assembly "P" polarized. Due to a change in the refractive index inside the optical crystal assembly, the light emerges as a divergent beam and forming a single focus having a longer focal length on the CD surface. In other words, at any one time, only one single focus is formed in the system according to the design of this invention, and therefore saves the trouble of two focuses coexisting and signals mixing up with each other as in a conventional system, and ensuring a better and a smoother optical focusing servo unit.

In view of the improvements from the excessive energy wastage and servo problems of a conventional system, the objects of this invention are achieved.

To enable a better understanding of the similarity and differences between the techniques used in this invention and a conventional one, a list is created below for comparison:

From the above list, major advantages of this invention include:

(1) detectable signal is strong and less energy is wasted.

(2) the mechanism of the optical focusing servo unit is non-confusing and therefore is error free.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims, which define the invention, should be accorded the broadest interpretation so as to encompass all such modifications and similar structures.

What is claimed is:

1. An optical pick-up head system for reading from and writing to a disc, comprising:

a laser diode light source, for generating a first light beam;

a beam splitter, for receiving the first light beam, and then generating a second light beam having an energy smaller than the first beam, and that the direction of propagation of the second beam is the same as the first beam;

a collimating lens, for receiving the second light beam and generating an approximately horizontal parallel light beam;

a polarization changer, for receiving the parallel light beam, and generating an approximately horizontal third light beam;

a deflecting mirror, for receiving the third light beam, and generating an approximately vertical, upwardly-propagating fourth light beam;

an optical crystal assembly, for receiving the fourth light beam, and generating an approximately vertical, upwardly-propagating, essentially parallel fifth light beam when the fourth light beam is of a first polarization, and generating an approximately vertical, upwardly-propagating, non-parallel fifth light beam when the fourth light beam is of a second polarization;

an objective lens, for receiving the fifth light beam, and focusing the beam onto a disc surface, and also for receiving a reflected light beam from the disc surface, and generating an approximately vertical, downwardly-propagating sixth light beam; and a photosensor assembly, for receiving an approximately vertical, downwardly-propagating seventh light beam generated by the sixth light beam after passing through the beam splitter, and generating a detectable opto-electrical signal.

2. An optical pick-up head system according to claim 1, wherein the polarization changer is a mechanical type of polarization changer.

3. An optical pick-up head system according to claim 1, wherein the polarization changer is an electronic type of polarization changer.

4. An optical pick-up head system according to claim 1, wherein the optical crystal assembly includes two pieces of optical crystal of the same material assembled together.

5. An optical pick-up head system according to claim 4, wherein the material used for fabricating the optical crystal assembly is calcite.

6. An optical pick-up head system according to claim 4, wherein the interface between the two pieces of optical crystal in the optical crystal assembly is a curved surface.

7. An optical pick-up head system according to claim 6, wherein the curved interface between the two pieces of optical crystal in the optical crystal assembly is a cylindrical surface.

8. An optical pick-up head system according to claim 6, wherein the curved interface between the two pieces of optical crystal in the optical crystal assembly is an aspherical surface.

9. An optical pick-up head system according to claim 1, wherein the energy content of the second light beam is approximately half that of the first light beam.

10. An optical pick-up head system according to claim 1, wherein the energy content of the sixth light beam is approximately equal to that of the second light beam.

11. An optical pick-up head system according to claim 1, wherein the energy content of the seventh light beam is approximately half that of the sixth light beam.

12. An optical pick-up head system according to claim 1, wherein the disc is a digital video disc.

13. An optical pick-up head system according to claim 12, wherein the third light beam is a "S" polarized light beam.

14. An optical pick-up head system according to claim 13, wherein the polarization changer is deactivated.

15. An optical pick-up head system according to claim 1, wherein the disc is a compact disc.

16. An optical pick-up head system according to claim 15, wherein the third light beam is a "P" polarized light beam.

17. An optical pick-up head system according to claim 16, wherein the polarization changer is activated.

18. An optical pick-up head system for reading from and writing to a disc, comprising:

a light source for generating a light beam;

a polarization changer that receives the light beam, and selectively changes a polarization of the light beam to transmit one of a light beam having a first polarization and a light beam having a second polarization;

an optical crystal assembly that receives the light bean from said polarization changer, and generates an essentially parallel light beam when the light beam from said polarization changer is of the first polarization, and generates a non-parallel light beam when the light beam from said polarization changer is of the second polarization;

an objective lens that receives the light beam from said optical crystal assembly and focuses the light beam onto a disc surface, and receives a reflected light beam from the disc surface; and a photosensor assembly that receives the reflected light beam and generates a detectable opto-electrical signal.

* * * * *